United States Patent [19]

Robinson

[11] 3,869,991

[45] Mar. 11, 1975

[54] STOWAGE OF VEHICLES
[76] Inventor: Christopher Thomas Robinson, c/o Containerised Automobiles Limited, 140 Park Ln., London W1Y 4HT, England
[22] Filed: June 20, 1973
[21] Appl. No.: 371,705

[52] U.S. Cl............................................. 105/368 R
[51] Int. Cl............................................... B65j 1/22
[58] Field of Search .................... 105/368 R, 368 T; 248/119 R

[56] References Cited
UNITED STATES PATENTS
| | | | |
|---|---|---|---|
| 1,280,512 | 10/1918 | Macomber...................... | 105/368 R |
| 1,299,912 | 4/1919 | Butterworth................ | 105/368 R X |
| 1,818,342 | 8/1931 | McCrea.......................... | 105/368 R |
| 1,847,405 | 3/1932 | MacDonald.................... | 105/368 R |
| 1,889,736 | 11/1932 | Hice............................... | 105/368 R |
| 2,098,184 | 11/1937 | Fehr et al....................... | 105/368 R |

*Primary Examiner*—M. Henson Wood, Jr.
*Assistant Examiner*—Gene A. Church
*Attorney, Agent, or Firm*—Young and Thompson

[57] ABSTRACT

The invention relates to a vehicle support frame for supporting a vehicle in a container at an angle to the horizontal. The frame comprises a pair of spaced foot members each having a holding leg extending therefrom, a beam spanning the holding legs on which is provided a pair of cradles for receiving one pair of vehicle wheels. A further beam adjacent the container floor spans the foot members of the next in line vehicle support frame and is also provided with a pair of cradles for receiving a second pair of vehicle wheels.

3 Claims, 3 Drawing Figures

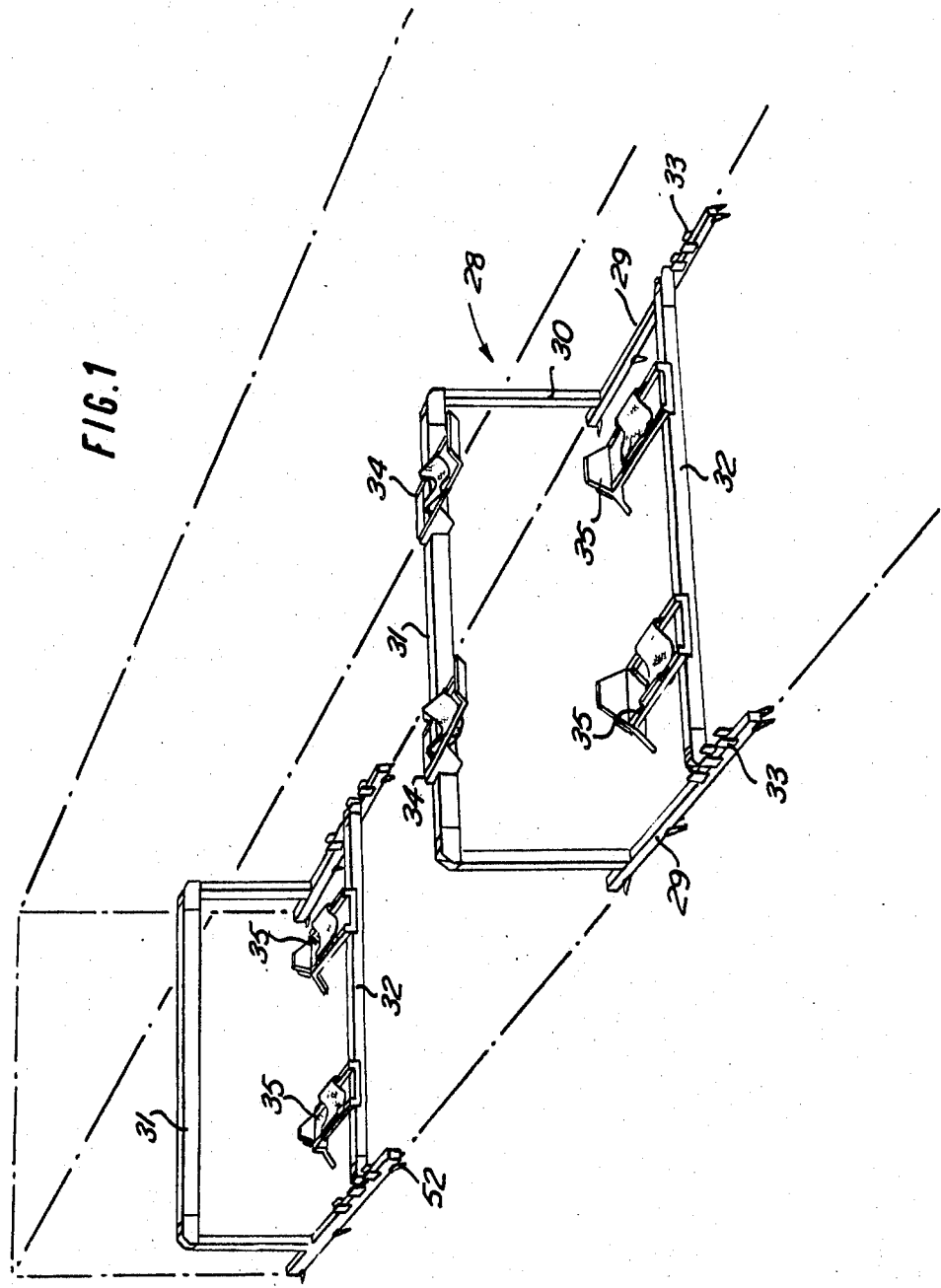

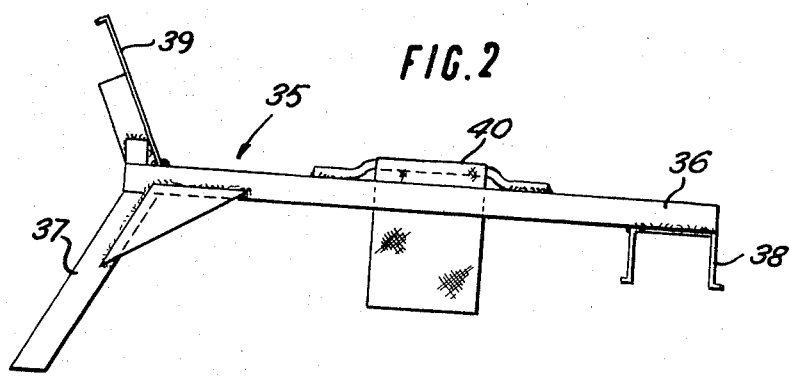
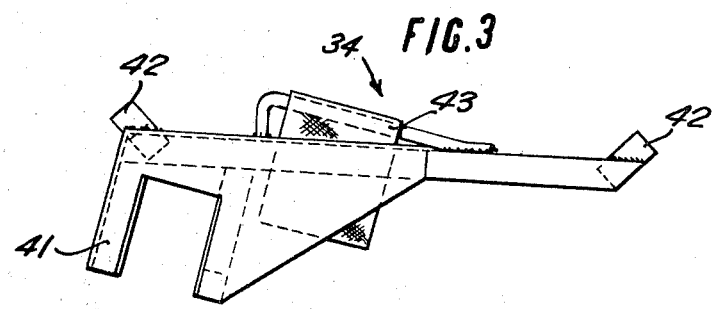

STOWAGE OF VEHICLES

BACKGROUND OF THE INVENTION

This invention relates to a vehicle support frame and is particularly useful in combination with a jack member for use in raising a vehicle onto the frame and which is described and claimed in our co-pending Serial No The frame is free-standing and is designed to transmit static and dynamic loading transit forces directly to the floor of a container without the need for the container's side or end walls to withstand other than nominal forces during loading or transit.

The problems of transporting vehicles in this manner fall into two main categories; first the vehicles must be packed in such a spatial configuration that they occupy the least possible shipping volume, being both close to each other and to a predetermined boundary surface and secondly the vehicles must be constrained from moving away from this configuration no matter to what handling loads they are subjected in transit.

The first condition requires some type of spatial framework allowing for double tier or inclination of the vehicles to produce the maximum volume utilisation factor. This framework should weight as little as possible for easy handling, and knock down to a very small volume for empty return shipment. It should be rigid enough to maintain its dimensions within close limits and finally, because of its inherent rigidity, it should permit any transient forces to follow a load path to the base level of the container without the need of external help from the container walls or roof.

The second condition requires that the vehicles be connected to this space frame in such a way as to prevent their relative movement during transport, so necessitating either a direct rigid tie down via the vehicle chassis to the frame; or a tie down from some part of the wheels to the frame.

The former (i.e., tie down via the chassis) is commonly used in conventional roll on ships and drive on car carrying trucks. Heavy chassis reinforcement is required on the vehicle at the point where restraining hooks are to be attached and heavy shock transients are apt to cause serious structural damage. This method inevitably leads to heavy preload in the vehicles' own suspension when tied down, if the tie down is to be adequately rigid, as a result of which the vehicles' tyres are also preloaded to some degree. After ten to twenty days at sea this often leads to permanent bruising and distortion of the tyre wall at one point, and shows up later on as an out of balance force on the wheel bearings.

The latter method (i.e., tie down via the wheels) is not so common, mainly because it involves a more difficult attachment problem, the tyre itself being flexible in all planes also the time taken to connect the wheels to the frame is inevitably greater due to access difficulties in a confined space. However the best attribute in this latter method is that it allows the vehicles' own suspension to dampen out transit shock accelerations provided the spatial layout of the vehicles allows for this nominal body shell movement.

Thus the design requirement may be defined under four main headings namely:

Firstly spatial holding frames should be rigid to maintain shape and allow the system to be independent of the container walls or roof by providing a load path directly to the container floor.

Secondly an attachment device should be positioned between the vehicle and the space frame to prevent their relative movement.

Thirdly the combination must be flexible enough in design to allow accommodation of vehicles of any reasonable wheel base inside as great a range of container sizes as is practical. All these principal attributes should be obtained with as few working parts as possible.

Fourthly loading the vehicles' bodies should be fast and not require a driver inside the vehicle during or after the lifting operation and, of course, it should meet the necessary Factory Act safety rules. Previous solutions to these problems have been on patent files at least since 1923.

Isadore Friedlander (in U.S. Pat. No. 1,521,613) proposed that an A frame layout should be used and advocated direct connection of the vehicles' axle nut to the frame. Multiple holes and bolts gave flexibility but the units depended on a side wall of the container for their ultimate support under heavy transient side loading, and the units weighed a considerable amount when knocked down. This system was largely discontinued with the arrival of bi-level special car-carrier rolling stock units in the late thirties. Lifting the vehicles was performed by a DF car loader (another Evans patented device), comprising a universal chain block system which could lift the rear wheels at any point in a container.

A second solution was proposed in 1928 by Sneider (U.S. Pat. No. 1,735,800) primarily for motor bodies. In this case telescopic cross-bar shelves were provided and securing was by means of variable position jig pins on these shelves. The Sneider system was very light but unfortunately depended entirely on the container's side wall for its side and vertical support since it was screwed into the wall of the container. This system has largely been superseded for car body movement, as such movement is now done on special jig frames that can be picked up and moved around by general purpose fork lift truck.

Design work in this whole field slowed down with the introduction of special car carrying ships as a result of war time experience and also bi-level and latterly trilevel rail cars for the same purpose. At about the same time special truck bodies were developed for auto route haulage of vehicles and these three modes are in almost exclusive use today.

Latterly a few systems have been developed notably the unregistered Allen system. In this system a rigid platform provided a space frame but the tie down arrangement (a simple plastics strap through the body and onto the frame) was found to be inadequate since it did not sufficiently prevent movement. The unit depended upon the side wall to stop lateral movement and its inclination angle was invariable. The unit did not knock down and was too heavy for general use. A fork lift truck was required for loading.

At about the same time the auto Perch IMM system was being developed comprising a horizontal wheel shelf which rested on side frames between the floor and roof reinforcement beams of a container. Wells in the sheel shelf both on the floor for the lower wheels and above the floor for the upper wheels were used for retention but entry and exit from these wells called for careful positioning with special loading ramps and caused delay. The unit was pin jointed and therefore not free standing neither was it independently joined to its neighbour but depended on the floor and roof beams for lateral support and longitudinal stability during transit. The roof beams of the container were not designed to be load supporting hence the longitudinal restraint was insufficient.

Wheel base and inclination angle were variable but fore and side chocking were inadequate allowing the vehicles to move independently relative to the frames which led to considerable damage. A fork truck was required and proved expensive as well as time consuming.

BRIEF DESCRIPTION OF THE DRAWINGS

FIG. 1 shows the vehicle and wheel supporting frames;

FIG. 2 shows a wheel support frame for engagement with a vehicle support frame and container floor; and FIG. 3 shows a wheel support frame for engagement with another part of the vehicle support frame.

DESCRIPTION OF THE PREFERRED EMBODIMENTS

Referring first to FIG. 1 of the drawings there is shown a vehicle support frame 28. Two such frames 28 are normally required to support a vehicle in a container.

Each frame comprises a pair of support feet 29 from each of which a holding leg 30 extends perpendicularly and is disposed adjacent one end of a support foot 29. A number of spikes 52 protrude at an angle from the underside of each support foot 29 to more firmly locate the support foot on a container floor when the vehicle support frame is loaded. The frame further comprises two transverse beams 31, 32. One beam 31 is adapted to be detachably connected at each of its ends to the free end of a holding leg 30. Taper wedge joints are used to connect the beam to the holding leg and are able, in the loaded position, to transmit all the transient loading stresses as bending moment whilst maintaining their rigidity. The other beam 32 is adapted to span the support feet 29 parallel to and spaced from the beam 31. A series of upstanding plates 33 are provided adjacent one end of each support foot 29 on the inner ones of which an end of beam 32 is received in one of a plurality of locations.

Two wheel cradles are normally accommodated on each transverse beam 31, 32; a cradle 34 which, in this embodiment, is suitable for receiving one of the rear wheels of a motor vehicle is shown in FIG. 1 and is releasably attached to beam 31. A wheel cradle 35 suitable for receiving one of the front wheels of a next succeeding motor vehicle is releasably attached to the beam 32. The beam 32 is shown in the Figure as being connected at the central one of its locations in the support feet 29.

A front wheel cradle 35 is shown in FIG. 2, and is adapted to extend forwardly of lower beam 32. The cradle comprises a frame 36 from one end of which extend legs 37 to rest on a container floor (not shown) and from the other end extends a channel bar 38 to locate the wheel cradle on transverse beam 32. A front stop plate 39 to abut a vehicle tyre and assist in preventing the wheel from leaving the front end of the cradle (on the left hand side as seen in FIG. 2) also extends from the frame opposite the legs 37. A flexible plastics belt 40 extends across two frame members and is attached thereto at its ends to provide a "hammock" for a vehicle wheel. The belt is designed to conform to the shape of a type profile and do so over a sufficient area of tyre to avoid creating an appreciable flat on the tyre in transit. Relative movement of the vehicle and frame is largely prevented in that the frame of the cradle is so sized to snugly receive a vehicle wheel.

Metal to rubber contact is prevented by providing multiple layers of plastics on the belt 40 between the cradle frame and the vehicle tyre.

A rear wheel cradle 34 similar to cradle 35 is illustrated in FIG. 3 and is adapted to extend rearwardly of the beam 31. Cradle 34 also comprises a frame, whose channel bar 41 is strengthened as compared with cradle 35 and is not provided with support legs but locates on beam 31 to act as a cantilever support. Under load this cradle puts the beam 31 in torsion and helps to lock the taper joints at the top and bottom of the holding legs 30. Cradle 34 is further provided with wheel stops 42 at each end of the frame and a flexible belt 43 to support a wheel.

To load and support a vehicle on a vehicle support frame 38 two jack members (not shown) are placed side by side and a telescopic lifting ramp of each jack member is adjusted having regard to the wheel base of the vehicle which is to be supported.

A pair of support feet 29 are then positioned astride the ends of the lifting ramps of the jack members, the beam 32 being connected across the feet and located on one of the inner plates 33 provided. A pair of wheel cradles 35 are so positioned on the beam as to align with the front wheels of the vehicle and the jack members so positioned that upswept ejector arms on each jack are located beneath the flexible belt 40 on each wheel cradle.

A transverse beam 31 is connected across the jack members with each of its ends located on a roller in a receiving slot. The rear wheel cradle 34 is spaced on beam 31 to correspond to the wheel track of the vehicle. When attached on the beam the cradle frame rests on wheel support arms provided on each jack member, and, with the jack in an initial rest position, surrounds a wheel ejector device of the jack member on which the vehicle wheel is to be initially supported. A vehicle is then moved along the jack members and brought to rest such that the front vehicle wheels are each supported in a wheel cradle 35 and the rear vehicle wheels are each positioned over a wheel cradle 34 and supported on an ejector device 20.

The jack members are then operated simultaneously by suitable means so that they are raised to a second elevated position. When the vehicle is at the required inclination a further pair of support feet 29 are positioned so that beam 32 can be supported at each of its ends on the holding legs 30 of the feet. The jack member fluid rams are again actuated so that they can be lowered and removed. A further vehicle can be supported so that its front wheels are held supported on a transverse beam connected to the rear support feet of the vehicle immediately forward of it. In this way a number of vehicles can be supported in-line and at an angle to the horizontal, each vehicle contributing to the rigidity of the frame structure by providing a connecting link between successive pairs of support frames 28.

When a vehicle is unloaded it is lowered from the support frames and the jack members are again required to lift and hold transverse beam 31 whilst the rear holding legs 28 of the last in-line vehicle are removed and the vehicle lowered by the jack members. As the jack members reach their initial rest position the front vehicle wheels are brought into engagement with upswept ejector arms and the rear vehicle wheels into engagement with a wheel ejector device, so that they are no longer supported on their respective wheel cradle belts. The vehicle can then be moved down the approach ramps of the jack members and off the container.

It will be appreciated that the whole supporting apparatus is easily dismantleable and the parts thereof can be closely packed for stowage in a container after delivery of the vehicles carried thereby.

I claim:

1. A frame for supporting a vehicle at an angle inclined to the horizontal, the frame comprising a pair of spaced foot members, a holding leg extending perpendicularly from each foot member, a beam adapted to be releasably attached at each of its ends to the free end of a holding leg, at least two vehicle wheel cradles attached to the said beam at spaced locations thereon, each cradle extending from said beam, and flexible belt means attached to each of said cradles on which a vehicle wheel can be held with its axis parallel to the longitudinal axis of said beam, each of said wheel cradles being adapted to cooperate with a jack whereby a vehicle wheel can be supported on said jack and does not come into contact with its wheel cradle until lifting of said jack commences.

2. A frame as claimed in claim 1 further comprising a second beam which spans said foot members and is releasably attached at its ends thereto, said second beam extending parallel to and spaced from the first-mentioned beam, and also having vehicle wheel cradles each to receive a wheel of a next succeeding vehicle.

3. In combination a plurality of vehicles supported on at least one frame as claimed in claim 2 each frame having a pair of vehicle wheels accommodated in the cradles of said first-mentioned beam and a pair of wheels of a next succeeding vehicle accommodated in the cradles of said second beam.

* * * * *